United States Patent [19]
Amro et al.

[11] Patent Number: 5,515,486
[45] Date of Patent: May 7, 1996

[54] METHOD, APPARATUS AND MEMORY FOR DIRECTING A COMPUTER SYSTEM TO DISPLAY A MULTI-AXIS ROTATABLE, POLYHEDRAL-SHAPE PANEL CONTAINER HAVING FRONT PANELS FOR DISPLAYING OBJECTS

[75] Inventors: Hatim Y. Amro, Austin; Troy L. Cline, Cedar Park; Scott H. Isensee, Georgetown; Ricky L. Poston, Austin, all of Tex.

[73] Assignee: International Business Machines Corporation, Armonk, N.Y.

[21] Appl. No.: 357,886

[22] Filed: Dec. 16, 1994

[51] Int. Cl.$^6$ ........................................ G06T 3/00
[52] U.S. Cl. ........................ 395/137; 395/119; 395/159
[58] Field of Search ........................ 395/119, 125, 395/127, 129, 130, 133–139, 141, 152, 155, 159, 161

[56] References Cited

U.S. PATENT DOCUMENTS

| | | |
|---|---|---|
| 4,868,785 | 9/1989 | Jordan et al. . |
| 4,982,344 | 1/1991 | Jordan . |
| 5,008,853 | 4/1991 | Bly et al. . |
| 5,072,412 | 12/1991 | Henderson, Jr. et al. . |
| 5,121,478 | 6/1992 | Rao . |
| 5,155,836 | 10/1992 | Jordan et al. . |
| 5,159,669 | 10/1992 | Trigg et al. . |
| 5,220,657 | 6/1993 | Bly et al. . |
| 5,233,687 | 8/1993 | Henderson, Jr. et al. . |
| 5,301,336 | 4/1994 | Kodosky et al. . |

OTHER PUBLICATIONS

"User-Oriented In-Line Panel Definition", IBM Technical Disclosure Bulletin, No. 10, Mar. 1988, p. 215.
"Controlling Multiple Panels in a user Interactive Display", IBM Technical Disclosure Bulletin, vol. 29, No. 6, Nov. 1986, p. 2649.

*Primary Examiner*—Almis R. Jankus
*Attorney, Agent, or Firm*—Diana L. Roberts

[57] ABSTRACT

A computer-implemented method, a uniquely programmed computer system, and a memory embodying detailed logic for directing a computer system to independently rotate a polyhedron display container about several axis. The computer-implemented method includes the steps of displaying a panel container on a display and, in response to a first command from user controls to select a first front panel in the panel container, horizontally rotating the first front panel to a central column if the first front panel is not in the central column. The method also includes the step of in response to the first command to select a second front panel, vertically rotating the second front panel to the central row if the second front panel is not in the central row.

24 Claims, 4 Drawing Sheets

METHOD, APPARATUS AND MEMORY FOR DIRECTING A COMPUTER SYSTEM TO DISPLAY A MULTI-AXIS ROTATABLE, POLYHEDRAL-SHAPE PANEL CONTAINER HAVING FRONT PANELS FOR DISPLAYING OBJECTS

BACKGROUND OF THE INVENTION

1. Field of the Invention

The following invention relates to improvements in desktop computing environments and, more particularly, but without limitation, to a system, method, and memory for providing independently rotatable display panels in a polyhedral display container.

2. Description of the Related Art

A "graphical user interface" (GUI) provides an interface between a user and a computer system's operating system. A "desktop" is a graphical user interface utilizing a desktop metaphor to permit user viewing and manipulation of system objects. The desktop includes at least one workspace (i.e., work surface) for users to store, manipulate, and view system objects. Some conventional desktops display a single front panel container in the workspace. This panel container contains icons representing frequently used objects, such as data files, controls, applications, and devices. Applications include, for example, text editors, databases, file managers, and games.

A desktop may include multiple workspaces for providing additional user space, thereby enabling the user to group similar windows and applications into meaningful sets. For example, one workspace may be used for calendar and mail applications, while another workspace may be used for engineering applications (e.g., CAD and drawing tools).

Hewlett-Packard's HP-VUE™ desktop includes multiple workspaces, a single front pane container displayed in each workspace, and a single front panel displayed in the front panel container. The single front panel displays various widgets, such as workspace switches, controls, and object icons. However, the major disadvantage of this desktop is that only a single front panel container and front panel are available. Consequently, the user cannot customize the controls, switches, and object icons displayed in the front panel container for different workspaces.

Another example of a conventional desktop, shown FIG. 1, includes front panels 10, 20, and 30 displayed inside front panel container 100. A user may rotate front panel container 100 about the horizontal X axis so that three or more different front panels (not shown) may be viewed. This rotation can be thought of as rotating a corn cob. However, front panel container 100 has limitations and disadvantages. First, because front panels 10, 20, and 30 are positioned in one vertical column, a user can only rotate those front panels about the horizontal X axis. As will be described herein, this inherently limits the number of front panels that can be displayed in front panel container 100. Second, the user cannot easily change the position of a front panel in relation to the position of another front panel. For example, a user may desire to position front panel 10 contiguous to front panel 30. However, with this conventional desktop, the user cannot easily move the front panels. Third, the design of front panel container 100 limits the user to viewing only a few front panels at a time.

Accordingly, demand exists for a front panel container that permits a user to independently rotate multiple front panels about varying axis, view numerous front panels at one time, and alter the position of front panels relative to one another.

SUMMARY OF THE INVENTION

Accordingly, a uniquely programmed computer system, computer-implemented method, and computer-readable memory embodying computer-readable detailed logic direct a computer system to provide multi-axis rotation of a polyhedral display container.

The computer-implemented method includes the steps of displaying a panel container on a display and, in response to a first command (e.g., a single click) from user controls (e.g., a mouse) to select a first front panel in the panel container, horizontally rotating the first front panel to a central column if the first front panel is not in the central column. The method also includes the step of in response to the first command to select a second front panel, vertically rotating the second front panel to the central row if the second front panel is not in the central row.

Therefore, it is an object of the present invention to provide a polyhedral display container that allows a user to independently rotate columns and rows of front panels about several axis.

It is a further object to provide a polyhedral display container that allows a user to view numerous front panels at one time.

It is another object to provide a polyhedral display container that allows a user to alter the position of front panels relative to one another.

These and other objects, advantages, and features will become apparent in light of the following drawings and detailed description.

DETAILED DESCRIPTION OF THE PREFERRED EMBODIMENT

The preferred embodiment include a computer-implemented method, a uniquely programmed computer system, and a memory embodying detailed logic for directing a computer system to independently rotate a polyhedron display container about several axis.

Figure 1:
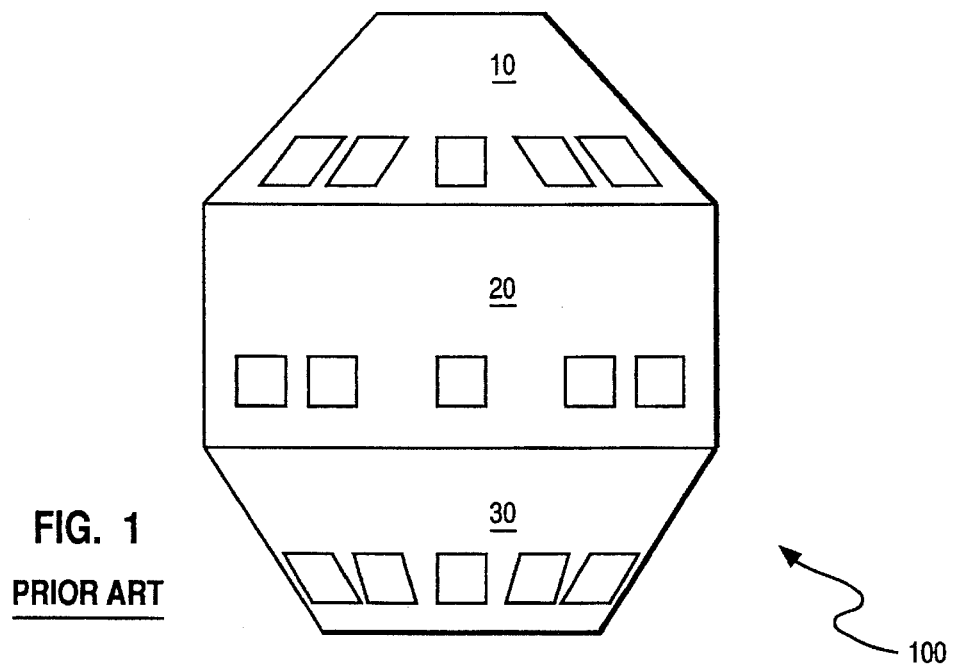
FIG. 1 illustrates a prior art front panel container.
Figure 2:
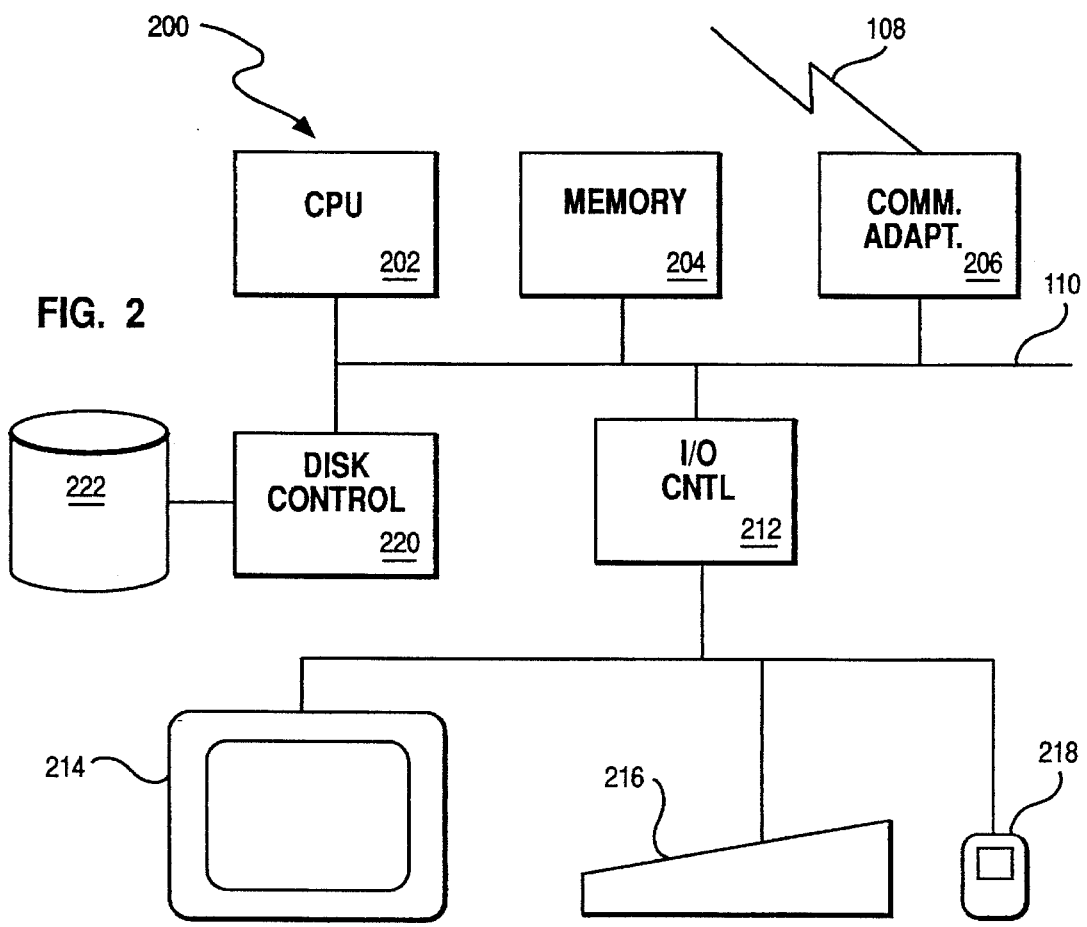
FIG. 2 illustrates a schematic diagram of a computer system for use with the present invention.

The present invention is practiced in a laptop computer or, alternatively, in the computer system shown in FIG. 2. Computer system 200 includes a central processing unit (CPU) 202, such as an IBM™ PowerPC™ 601 or Intel™ 486 microprocessor:, for processing. One or more disks 222, controlled by disk controller 220, provide long term storage. A variety of other storage media may be employed, including tape, CD-ROM, and WORM drives. Removable storage media may also be provided to store data or computer process instructions.

Instructions and data from the desktop of any suitable operating system, such as Sun's Solaris™, Microsoft's Windows NT™ or Apple's System 7™, control CPU 202 from random access memory (RAM) 204. Accordingly, the desktop executes from RAM 204. However, in the preferred embodiment, a IBM RISC System/6000™ runs the AIX™ operating system (IBM, RISC System/6000, and AIX are trademarks of the IBM Corp.). As previously described, however, one skilled in the art readily recognizes that other hardware platforms and operating systems may be utilized to implement the present invention.

Users communicate with computer system 200 through I/O devices controlled by I/O controller 212. Display 214 displays information to the user, while keyboard 216 and pointing device 218 allow the user to direct the computer system. Communications adapter 206 controls communications between this processing unit and other processing units connected to a network by network interface 208.

Figure 3:
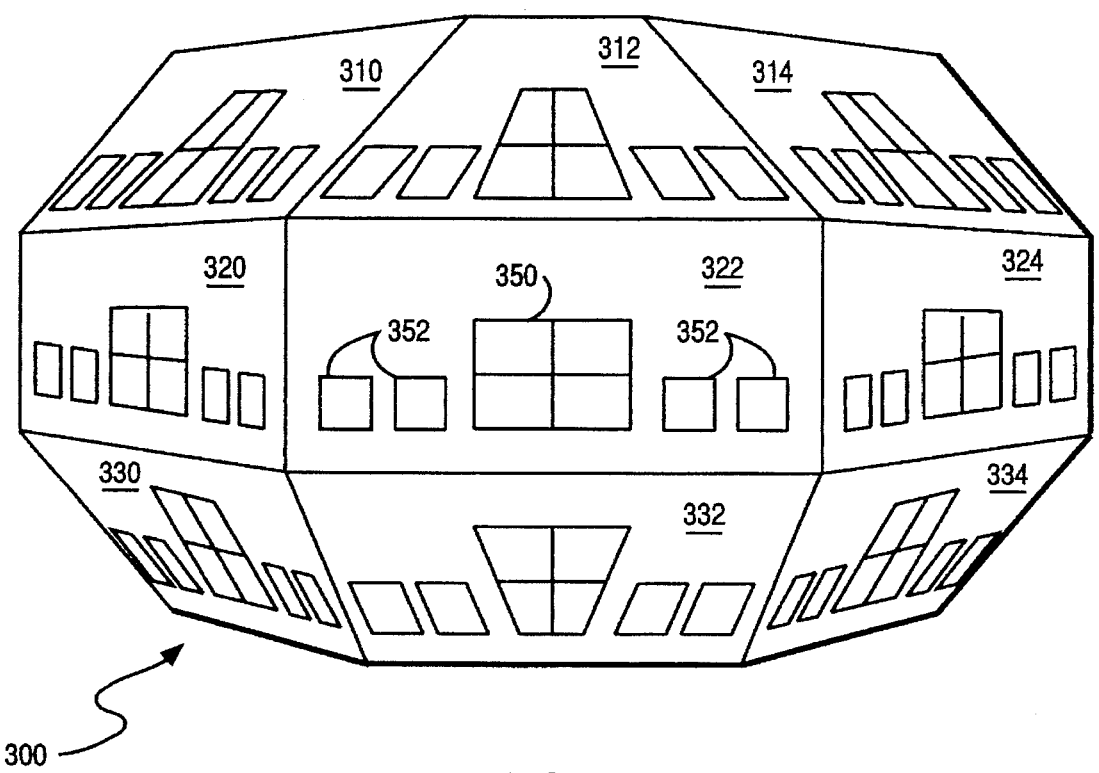
FIG. 3 illustrates a schematic diagram of the front panel container according to the present invention.

Referring to FIG. 3, the preferred embodiment includes a desktop (herein DT) enhancement for displaying front panel container 300 on display 214. For ease in explanation, the following description will describe the DT as performing unique functions and features. In actuality, the DT merely directs CPU 202 to perform those functions and features.

Front panel container 300 is a three-dimensional, polyhedron having multiple front panels 310, 312, 314, 320, 322, 324, 330, 332, 334, and others (not shown) that form the non-visible sides of the polyhedron. Each front panel contains four icons 352 and workspace switches 350. Alternatively, any number of icons, controls, or workspace switches could be included.

In the preferred embodiment, only the central front panel (e.g., front panel 322) is active, meaning that only its objects can be activated (e.g., opened). Alternatively, one skilled in the art will recognize that other displayed front panels could be active. In one example, front panel 322 contains four engineering drawing tools. Each of these drawing tools could run in a separate workspace, wherein workspace switch 350 would allow the user to switch between these workspaces. To do so, the user merely positions a pointer over the desired switch and clicks pointing device 218. Manipulating and opening objects using pointing devices (e.g., mouses) is well known in the computer art.

Front panel container 300 enables the user to rotate its panels about four axis, namely the X, Y, and left and right diagonal axis. Each rotation about an axis is independent of the others. To rotate a column, row, or diagonal row about an axis, the user utilizes pointing device 218 (see FIG. 2). The user may either click or double click the mouse pointer over empty space in any visible front panel, except the central front panel (e.g., front panel 322). Any clicks over empty space in the central front panel is inoperative.

If the user single clicks over empty space in front panel 330, the DT rotates font panel 330 to the lower front position (i.e., where front panel 332 is positioned in FIG. 3). In turn, the DT rotates front panel 332 to the position of front panel 334, while front panel 334 rotates out of the user's view. In this manner, the bottom row of front panels rotates about the Y axis.

Similarly, if the user single clicks over empty space in front panel 312, the DT rotates front panel 312 to the central front position (i.e., where front panel 322 is positioned in FIG. 3). In turn, the DT rotates front panel 322 to the position of front panel 332, while front panel 332 rotates out of the user's view. In this manner, the center column of front panels rotates about the X axis.

To rotate a front panel about the left or right diagonal axis, the user must double click the pointer over that front panel's empty space. The front panel will always move toward the central position. Therefore, double clicking over a front panel in the center row or center column (e.g., front panels 320, 322, and 324) is inoperative. If the user double clicks over empty space of front panel 310, the DT rotates front panel 310 to the center front position (i.e., where front panel 322 is positioned in FIG. 3). In turn, the DT rotates front panel 322 to the position of front panel 334, while front panel 334 rotates out of the user's view. In this manner, the front panels rotate about a diagonal axis.

Similarly, if the user double clicks over empty space of front panel 334, the DT rotates front panel 334 to the center front position (i.e., where front panel 322 is positioned in FIG. 3). In turn, the DT rotates front panel 322 to the position of front panel 310, while front panel 310 rotates out of the user's view. In this manner, the front panels rotate about a diagonal axis.

Figure 4:
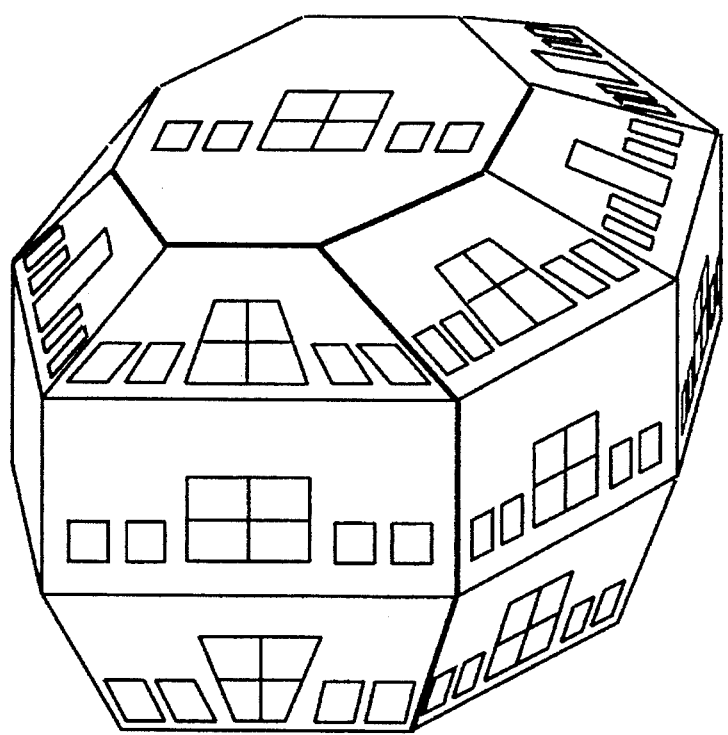
FIG. 4 illustrates a schematic diagram of the front panel container according to the present invention.

FIG. 4 illustrates a different three-dimensional view of front panel container 300 (see FIG. 3.) to show the multiple panel arrangement.

Figure 5:
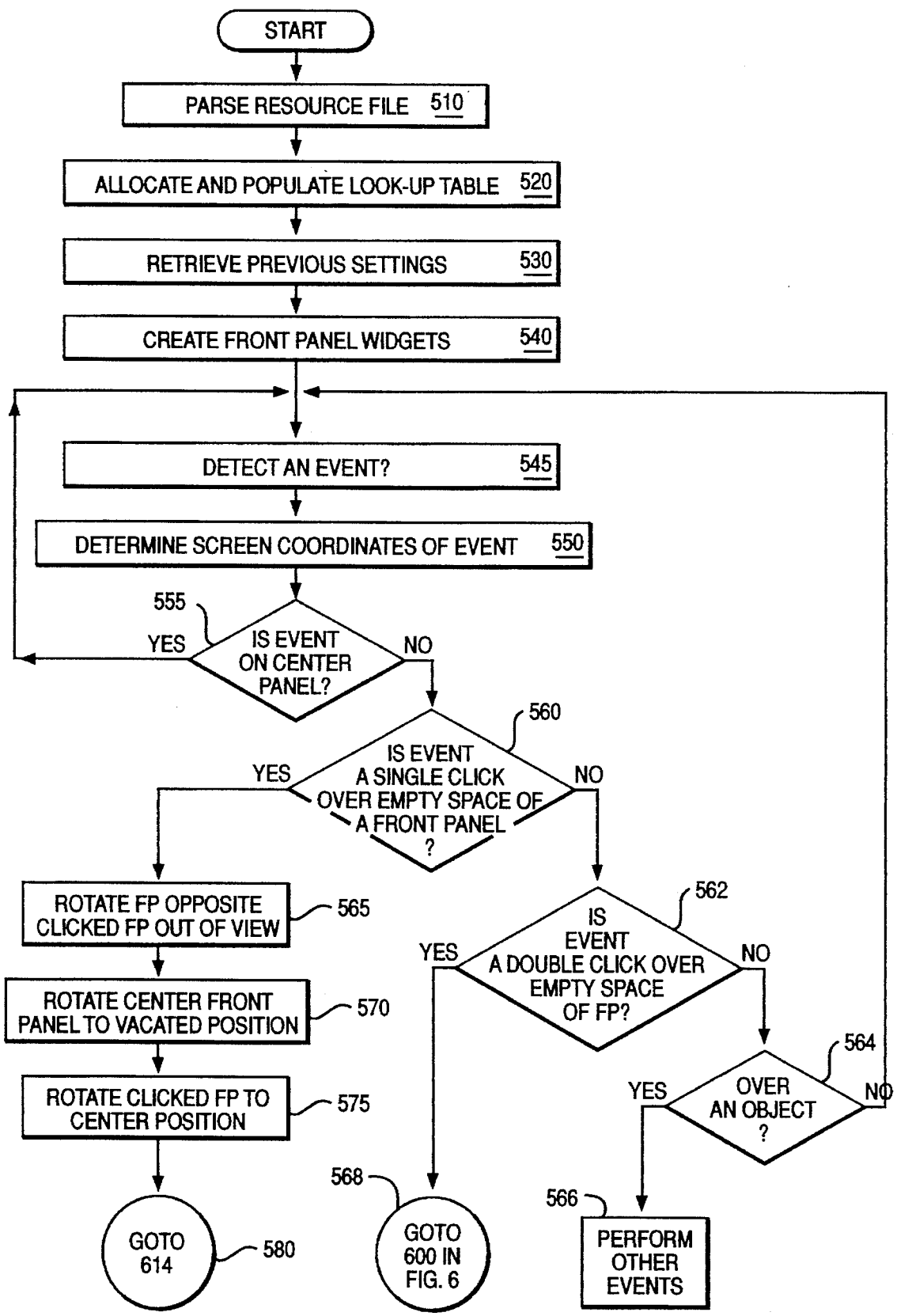
FIG. 5 illustrates a flow chart of detailed logic according to the present invention.

The flow of execution for the preferred embodiment is as follows:

FIG. 5 illustrates detailed logic for implementing the preferred embodiment. At 510, the initialization process begins. The DT loads from one drive of disk drives 222 a front panel container resource file (not shown) into RAM 204. The front panel container resource file contains the number of front panels in the front panel container, a default arrangement of those front panels, the number of workspaces in each front panel, and descriptive information about the objects present in each front panel. The descriptive information includes the image (e.g., icon) representing the object, the location of the object within the front panel, the command(s) necessary to open the object when selected, and the command(s) executed when a user drops an object on another front panel object. Several conventional desktops utilize resource files and, therefore, are well known in the computer art. The DT parses this resource file into system-recognizable data.

At 520, the DT allocates space in RAM 204, creates a look-up table in that allocated space for retaining data structures, and populates that look-up table with the parsed data from the resource file. The look-up table dynamically maintains the screen coordinates of each front panel and object(s) within each front panel. Therefore, when the user rotates a front panel, its coordinates are updated in the look-up table. At 530, the DT retrieves from hard disk 222 any settings saved from the previous session and populates the look-up table with those settings. Accordingly, the DT changes the default arrangement of the front panels to the previous setting, if any. At 540, the DT creates any front panel widgets and controls for each displayed front panel using the newly populated look-up table.

At 545, the DT detects an event (e.g., click on a front panel) from an event queue (not shown) in RAM 204. At 550, the DT determines and dispatches the coordinates of the event to an event loop executing in RAM 204. At 550, the DT examines the screen coordinates of the event. At 555, a determination is made as to whether the event occurred on the front center panel. If so, control returns to step 545. Otherwise, at 560, the DT determines if a single click event occurred over empty space of a front panel. The DT uses a conventional software timer to determine if the click was single or double. At 565, if the event was a single click over an empty space of a front panel, the DT rotates the front panel on the opposite side of the center front panel (in relation to the clicked front panel) out of view. At 570, the center front panel rotates to the vacated position of the previously rotated front panel. At 575, the clicked front panel rotates to the center front panel. The DT updates the look-up table according to the rotations. At 580, control jumps to 614 (see FIG. 6).

At 560, if the event was not a single click over an empty space of a front panel, at 562, the DT determines if the event was a double click over an empty space of a front panel. If so, control transfers to 600 in FIG. 6. If not, at 564, the DT determines if the event occurred over an object within a front panel. If the event occurred over an object within a front panel, other events are performed at 566. If not, control returns to 545.

Figure 6:
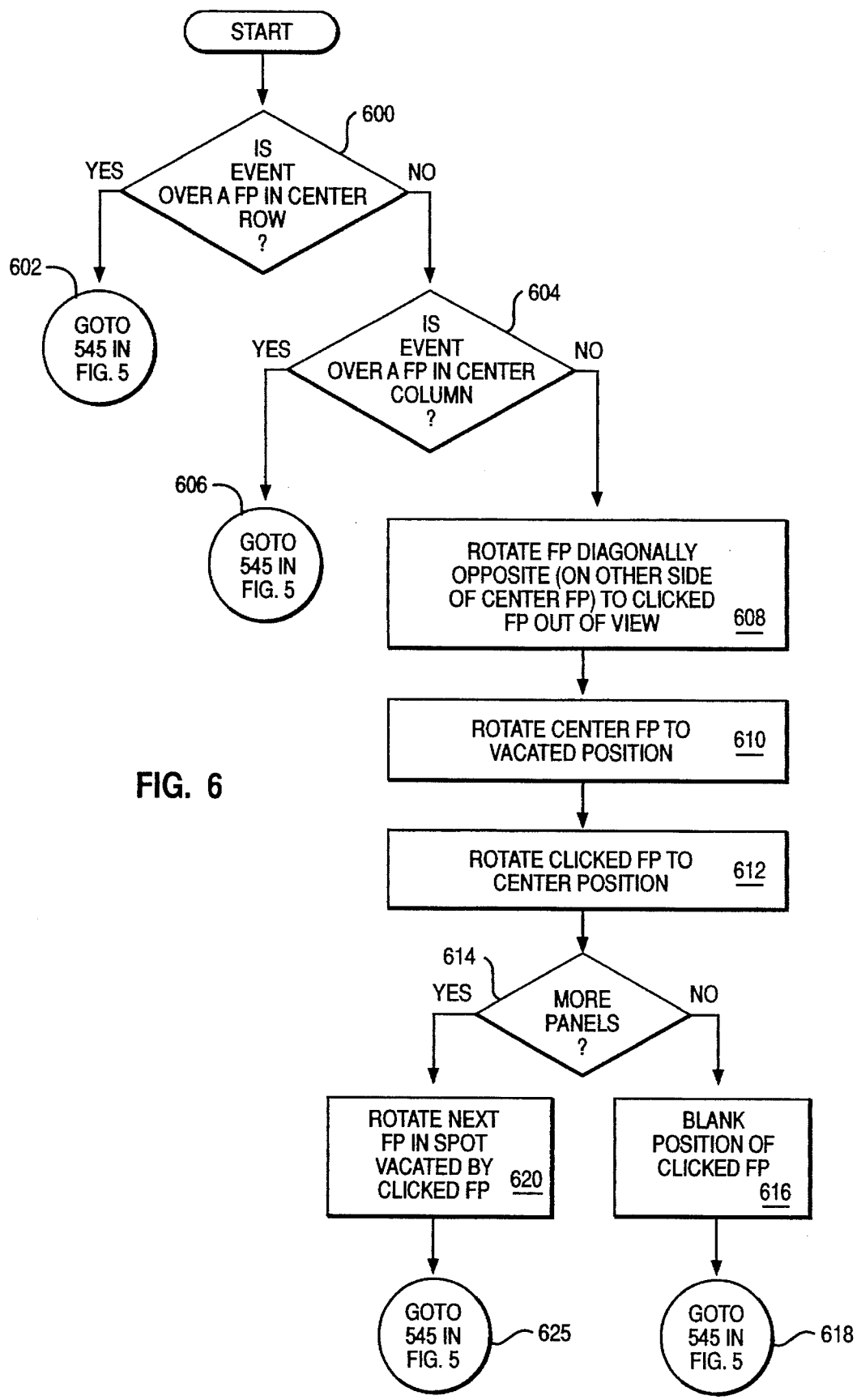
FIG. 6 illustrates a flow chart of detailed logic according to the present invention.

Referring to FIG. 6, the DT determines if the event occurred over a front panel in the center row. If so, control returns to 545 in FIG. 5. If not, at 604, the DT determines if an event occurred over a front panel in a center column. If so, control returns to 545 in FIG. 5. If not, at 608, the DT rotates the front panel positioned diagonally opposite (i.e., on the other diagonal side of the center front panel from the clicked front panel) out of view. At 610, the DT rotates the center front panel to the vacated position. At 612, the DT rotates the clicked front panel to the center front position.

At 614, the DT examines the look-up table to determine if additional front panels exists. If so, the DT rotates next front panel into the previous position of the clicked front panel. If additional front panels do not exist, the DT blanks out the previous position of the clicked front panel. The DT updates the new front panel positions in the look-up table. At either 618 or 625, control returns to 545 in FIG. 5.

While the invention has been shown and described with reference to particular embodiment thereof, it will be understood by those skilled in the art that the foregoing and other changes in form and detail may be made therein without departing from the spirit and scope of the invention.

What is claimed is:

1. A computer-implemented method for displaying a multi-axis rotatable, polyhedral-shaped panel container, the panel container having a front panel for displaying objects, the sides organized in a plurality of rotatable rows of panels and columns of panels, the panel container having a central row and central column of panels, wherein the central row and central column intersect at the front panel, comprising the steps of:

displaying said panel container on a display;

in response to a first command from user controls to select a first panel in said panel container, horizontally rotating said first panel to said central column if said first panel is not in said central column; and in response to said first command from said user controls to select a second panel, if said second panel is in said central column, vertically rotating said second panel such that said second panel becomes said front panel.

2. The computer-implemented method according to claim 1 further comprising the step of:

in response to a second command from said user controls to select a third panel, if said third panel is not in said central column and said central row, diagonally rotating said third panel such that said third panel becomes said front panel.

3. The computer-implemented method according to claim 2, wherein said step of diagonally rotating said third panel if said third panel is not in said central column and said central row comprises the following steps:

diagonally rotating said front panel from a central front panel position in a rotational direction of said third panel; and diagonally rotating an additional panel to the previous position of said third panel.

4. The computer-implemented method according to claim 2 wherein said second command comprises a double click from a mouse over empty space of said third panel.

5. The computer-implemented method according to claim 1 further comprising the steps of:

horizontally rotating a fourth front panel positioned adjacent to said first panel in a horizontal rotational direction of said first panel; and vertically rotating a fifth front panel positioned adjacent to said second panel in a vertical rotational direction of said second panel.

6. The computer-implemented method according to claim 1 further comprising the step of placing object icons within said first and second panels.

7. The computer-implemented method according to claim 1 wherein said first command comprises a single click from a mouse over empty space of said first or second panel.

8. The computer-implemented method according to claim 1 further comprising the step of placing a workspace switch within said first or second panel.

9. A computer system for displaying a multi-axis rotatable, polyhedral-shaped panel container for displaying computer objects, the panel container having a front panel for displaying objects, the sides organized in a plurality of rotatable rows of panels and columns of panels, the front panel container having a central row and central column of panels, wherein the central row and central column intersect at the front panel, comprising:

user controls;

a processor for receiving a first command from said user controls to select a first panel in said panel container;

in response to said first command, said processor for horizontally rotating said first panel to said central column if said first panel is not in said central column; and in response to said first command to select a second panel, if said second panel is in said central column, said processor for vertically rotating said second panel such that said second panel becomes said front panel.

10. The computer system according to claim 9 further comprising:

in response to a second command from said user controls to select a third panel, said processor for diagonally rotating said third panel to become said front panel if said third panel is not in said central column and said central row.

11. The computer system according to claim 10, further comprising:

said processor for diagonally rotating said front panel from a central front panel position in a rotational direction of said third panel; and said processor for diagonally rotating an additional front panel to the previous position of said third panel.

12. The computer system according to claim 10 wherein said second command comprises a double click from a mouse over empty space of said third panel.

13. The computer system according to claim 9 further comprising the steps of:

said processor for horizontally rotating a fourth panel positioned adjacent to said first panel in a horizontal rotational direction of said first panel; and said processor for vertically rotating a fifth front positioned adjacent to said second panel in a vertical rotational direction of said second panel.

14. The computer system according to claim 9 further comprising the step of placing object icons within said first and second panels.

15. The computer system according to claim 9 wherein said first command comprises a single click from a mouse over empty space of said first or second panels.

16. The computer system according to claim 9 further comprising said processor for placing a workspace switch within said first or second panels.

17. A computer-readable memory embodying detailed logic for directing a computer system to independently rotate a multi-sided, polyhedron panel display container about several axis, the panel display container having a central row and central column of panels, wherein the central row and central column intersect at a front panel, comprising:

first detailed logic for displaying said panel container on a display;

in response to a first command from user controls to select a first panel in said panel container, second detailed logic for horizontally rotating said first panel to become said front panel if said first panel is not in said central column; and in response to said first command from said user controls to select a second front panel, if said second panel is in said central column, third detailed logic for vertically rotating said second panel such that said second panel becomes said front panel.

18. The memory according to claim 17 further comprising:

in response to a second command from said user controls to select a third panel, if said third panel is not in said central column and said central row, fourth detailed logic for diagonally rotating said third panel such that said third panel becomes said front panel.

19. The memory according to claim 18, wherein said fourth detailed logic for diagonally rotating said third panel if said third panel is not in said central column and said central row comprises:

fifth detailed logic for diagonally rotating said front panel from a central front panel position in a rotational direction of said third panel; and sixth detailed logic for diagonally rotating an additional panel to the previous position of said third panel.

20. The memory according to claim 18 wherein said second command comprises a double click from a mouse over empty space of said third panel.

21. The memory according to claim 17 further comprising:

seventh detailed logic for horizontally rotating a fourth front panel positioned adjacent to said first panel in a horizontal rotational direction of said first panel; and eighth detailed logic for vertically rotating a fifth front panel positioned adjacent to said second panel in a vertical rotational direction of said second panel.

22. The memory according to claim 17 further comprising ninth detailed logic for placing object icons within said first and second panels.

23. The memory according to claim 17 wherein said first command comprises a single click from a mouse over empty space of said first or second panel.

24. The memory according to claim 17 further comprising tenth detailed logic for placing a workspace switch within said first or second panel.

* * * * *